(12) United States Patent
Robb et al.

(10) Patent No.: US 8,516,249 B2
(45) Date of Patent: Aug. 20, 2013

(54) CLOUD SERVICES LAYER

(75) Inventors: Terence Robb, Colorado Springs, CO (US); Roger Dale Harris, Colorado Springs, CO (US); William Martin Lacey, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 336 days.

(21) Appl. No.: 12/908,019

(22) Filed: Oct. 20, 2010

(65) Prior Publication Data

US 2012/0102539 A1 Apr. 26, 2012

(51) Int. Cl.
 *H04L 29/06* (2006.01)
(52) U.S. Cl.
 USPC .......................................................... 713/167

(58) Field of Classification Search
 USPC .................................. 713/165, 167; 726/1, 2
 See application file for complete search history.

(56) References Cited

U.S. PATENT DOCUMENTS

| | | | |
|---|---|---|---|
| 7,272,625 B1 * | 9/2007 | Hannel et al. | 709/200 |
| 2006/0168259 A1 * | 7/2006 | Spilotro et al. | 709/229 |
| 2006/0259980 A1 * | 11/2006 | Field et al. | 726/27 |
| 2010/0211781 A1 * | 8/2010 | Auradkar et al. | 713/168 |

* cited by examiner

*Primary Examiner* — Ali Abyaneh

(57) ABSTRACT

A method including receiving a service registration request to register a service with a multi-tenant, multi-service cloud network from a user; registering object types that pertain to the service, wherein the object types include at least one service object type that is not an object type offered by the cloud network to the user; and registering objects based on the object types, wherein the objects include at least one object associated with the at least one service object type.

20 Claims, 14 Drawing Sheets

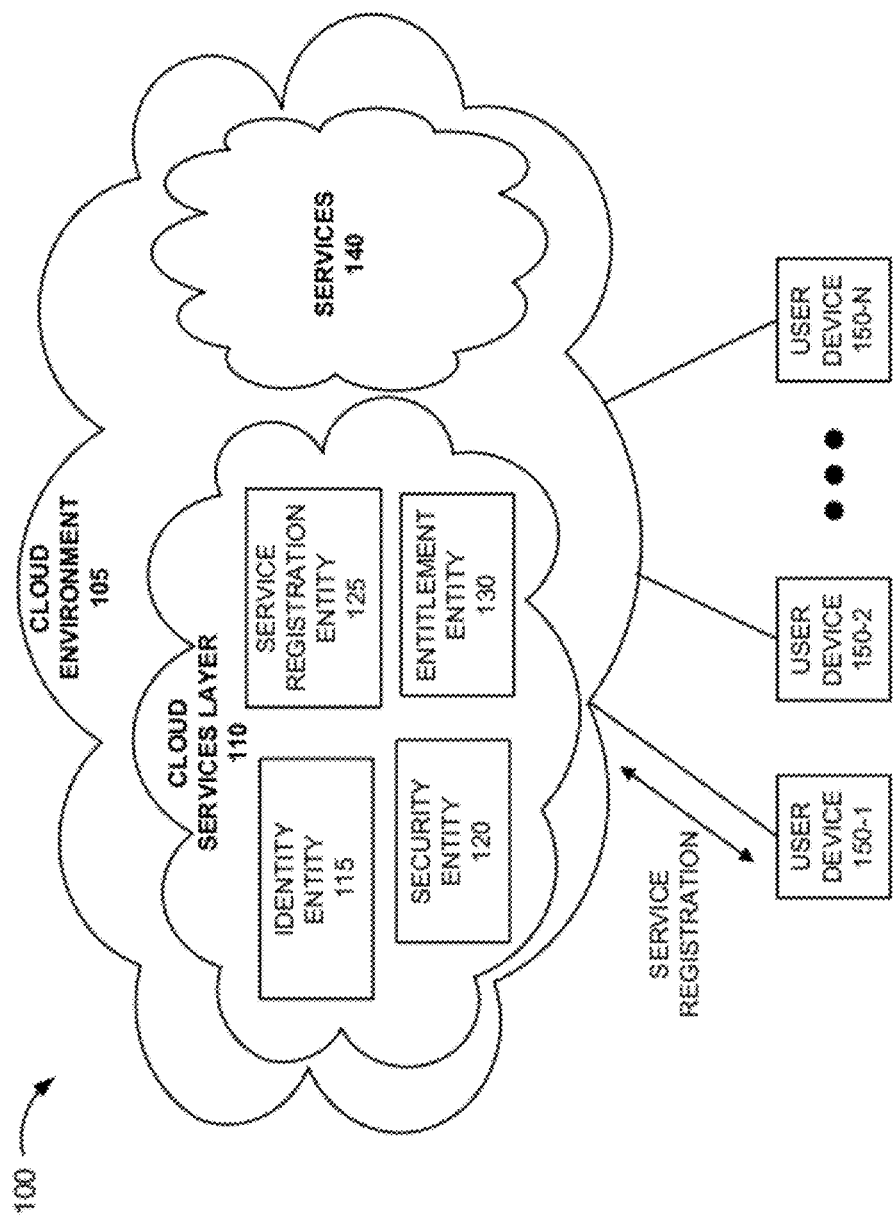

| POLICY 340 | PRIVILEGES FOR OBJECT: ORG.A.MY-FARM | | |
|---|---|---|---|
| | MEMBER 345 | ALLOW 347 | DENY 347 |
| CAAS-ADMIN POLICY | RAM-ADMIN-GRP | ☒ | ☐ | REMOVE |
| CAAS-ADMIN POLICY | PVV-ADMIN-GRP | ☒ | ☐ | REMOVE |
| CAAS-ADMIN POLICY | IT-ADMIN-GRP | ☐ | ☒ | REMOVE |
| | ▶ | ☐ | ☐ | ADD |

• • •

SAVE  APPLY  CANCEL  REPORTS

- 370 SERVICE: CAAS
- 372 NAME: CAAS-ADMIN-POLICY
- 374 DESCR: CREATES A POLICY TO SUPPORT THE CAAS ADMIN ROLE
- 376 ROLES: CAAS-ADMIN [UPDATE]
- 378 POLICIES: <NONE> [UPDATE]
- 380 OBJECT-TYPES: CAAS-FARM [UPDATE]
- 382 OBJECT-ATTR: GARM-COMPLIANT [UPDATE]

POLICIES

[SAVE] [APPLY] [CANCEL] [DELETE] [REPORTS]

CLOUD SERVICES LAYER

BACKGROUND

Typically, cloud computing corresponds to an Internet-based computing environment in which services are provided to devices on-demand. Cloud environments may deliver these services using client/server models, data centers, etc., as well as other types of architectures.

BRIEF DESCRIPTION OF THE DRAWINGS

FIGS. 1B-1E are diagrams illustrating an exemplary process in which an exemplary cloud environment may provide service registration and offer access to services;

FIG. 3C is a diagram illustrating an exemplary user interface associated with a privilege object;

FIG. 3F is a diagram illustrating an exemplary user interface associated with a policy object.

DETAILED DESCRIPTION OF PREFERRED EMBODIMENTS

Figure 1A:
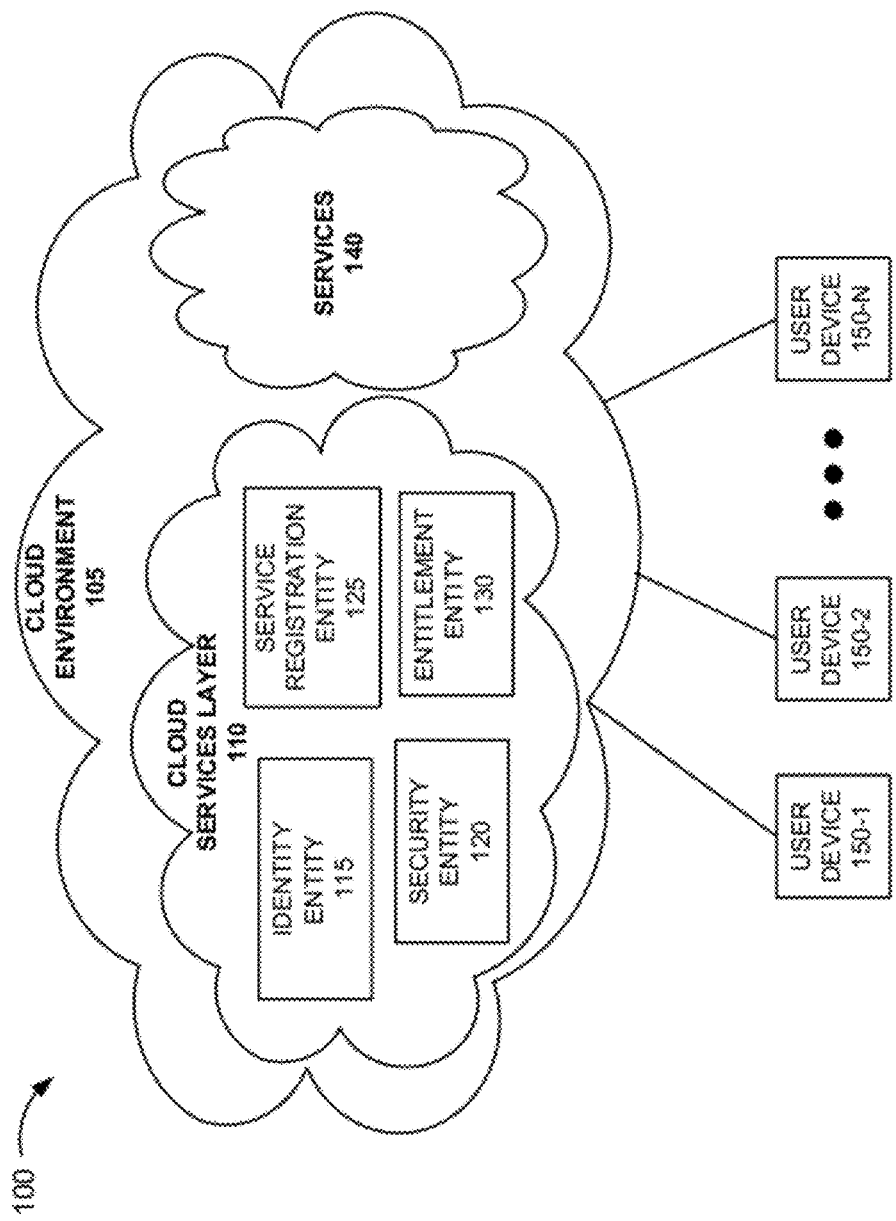
FIG. 1A is a diagram illustrating an exemplary environment in which an exemplary embodiment of a cloud environment that includes a cloud services layer may be implemented.

The following detailed description refers to the accompanying drawings. The same reference numbers in different drawings may identify the same or similar elements. Also, the following detailed description does not limit the invention.

The term "object," as used herein, is intended to be broadly interpreted to include, for example, an entity associated with a service. As will be described further below, exemplary embodiments of the cloud environment may include various types of objects. An object may be implemented by hardware, software, and/or firmware.

According to exemplary embodiments described herein, a cloud environment may provide a multi-tenant, multi-service platform. In other words, for example, the cloud environment may allow multiple organizations that include multiple users to consume multiple services. The number of organizations, users, services, and/or the relationships between the organizations, the users, and the services may not be known in advance to those (e.g., the users, the organizations, etc.,) using/participating in the cloud environment, and may not remain static in nature within the cloud environment. In this way, organizations, users, and/or services may freely enter/register with and leave/unregister with the cloud environment.

According to an exemplary embodiment, the cloud environment may include a cloud services layer that may allow a user to register/unregister a service with the cloud environment. The service may correspond to, for example, an end service, a management service of a service, or some other type of service. For example, the cloud environment may include management services (e.g., e-mail management services, storage management services, etc.) in which users may access the managed service (e.g., e-mail, storage, etc.) outside of the cloud environment once the managed service is registered with the cloud services layer. In other cases, the cloud environment may include the service that users may access after such service is registered with the cloud services layer.

According to an exemplary embodiment, the cloud services layer may provide various object types that may be used during the registration of a service. By way of example, the cloud services layer may provide a service object type, a privilege object type, a roles object type, a policies object type, a permissions object type, a user object type, an organization object type, and/or a group object type. During the registration process, objects may be instantiated based on the object types provided by the cloud services layer. Additionally, according to an exemplary embodiment, the cloud services layer may allow the registration of unique object types not specifically provided by the cloud services layer. By way of example, a unique, service-related object type may correspond to a server object type, a disk object type, a farm object type, or some other service-related object type that is applicable to the service being registered. In this way, a user may register, for example, unique, service-related object types such that the cloud environment may be dynamically driven. This is distinctive from, for example, other multi-tenant, multi-service cloud environments in which an object type (e.g., a service object type) is pre-defined by a system that controls all of the services registered with the cloud environment. Additionally, such systems typically offer a pre-defined role object, a policy object type, a permissions object type, etc., that are associated with or applicable to the service object, etc. According to such systems, however, to provide additional service-related object types, the system would have to be upgraded. In contrast, the cloud services layer may recognize and manage the object type (e.g., a unique, service object type) or class of object (e.g., service object type), as well as, permission objects, etc., that may be registered with the unique object type so that that user may register object types not specifically provided by the cloud services layer. According to an exemplary embodiment, services and/or other objects may be registered with the cloud environment based on web service interfaces or other application programming interfaces designed to accept formatted input, such as, for example, Extensible Markup Language (XML), Comma Separated Values, or other industry standards. The input may then be processed and converted to objects within the cloud environment.

According to the exemplary embodiments, the cloud services layer may permit services, access to services, etc., to be customized in the multi-tenant, multi-platform cloud environment based on the unique, service-related object types. For example, the cloud services layer may allow the user to register unique, service-related object types, as well as register policy objects, role objects, permission objects, etc., that pertain to the unique, service-related object types. In this way, the service may limit access of the users to these unique, service-related object types based on the policies, roles, permissions, etc.

According to an exemplary embodiment, the cloud services layer may include four entities. The first entity may include an identity entity that represents organizations, users, and services. The second entity may include a security entity that represents permissions, roles, policies, and privileges. The third entity may include a service registration entity that represents a set of operations to allow service registration for participants. The fourth entity may include an entitlement entity that represents a set of operations to assign permissions and determine access to the cloud environment or to a service provided within the cloud environment.

According to other embodiments, the cloud services layer may include fewer entities, additional entities, and/or different entities. Additionally, or alternatively, according to other embodiments, the cloud services layer may perform fewer processes and/or functions, additional processes and/or functions, and/or different processes and/or functions than those described herein.

According to an exemplary embodiment, the identity entity may include objects, such as, for example, an organization object, a user object, a group object, and a service object. For example, the organization object may represent a collection point for user objects, group objects, service objects, or other entities. The user object may, for example, represent an operator. For example, the operator may correspond to a person or a function capable of performing action(s) within the cloud environment. Also, for example, the group object may represent a collection of user objects, group objects, or organization objects. The service object may, for example, represent a service or a feature, a function, etc., associated with the service. In other words, the service object may represent a collection of related capabilities that may be grouped together and/or offered by a system or a provider. The identity entity will be described further below.

According to an exemplary embodiment, the security entity may include objects, such as, for example, a permission object, a role object, a policy object, and a privilege object. The permission object may, for example, specify a permission that may be checked during an entitlement process. The role object may, for example, specify a role (e.g., associated with a user, etc.) or a permission. The role object may bundle permissions so that such permission may be granted as a collection of permissions rather than individually. The policy object may, for example, associate a role with an object type. The privilege object may, for example, associate a policy object with a user object, a group object, or an organization object. In turn, this association may be assigned to an instance of an object (e.g., an instantiated object). The security entity will be described further below.

According to an exemplary embodiment, the service registration entity may allow a user to register a service with the cloud environment. For example, when a service is registered with the cloud environment, the service may be available for use by users having appropriate permissions. The service registration entity will be described further below.

According to an exemplary embodiment, the entitlement entity may allow permission to users to access, use, perform, etc. an operation. For example, the entitlement entity may perform a permissions check and allow or deny permission based on privileges associated with an object. The entitlement entity will be described further below.

FIG. 1A is a diagram illustrating an exemplary environment 100 in which an exemplary embodiment of a cloud environment that includes the cloud services layer may be implemented. As illustrated, environment 100 may include a cloud environment 105, a cloud services layer 110 that includes an identity entity 115, a security entity 120, a service registration entity 125, and an entitlement entity 130, services 140, and user devices 150-1 through 150-N (referred to generally as user device 150 or user devices 150).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1A. Additionally, or alternatively, in practice, environment 100 may include additional networks, fewer networks, and/or differently arranged networks, than those illustrated in FIG. 1A. For example, environment 100 may include networks outside of cloud environment 105 that provides services, resources, assets, etc. Also, according to other exemplary embodiments, one or more functions and/or processes described as being performed by a particular device may be performed by a different device, or some combination of devices. Environment 100 may include wired and/or wireless connections among the devices illustrated in FIG. 1A.

Cloud environment 105 may correspond to a cloud network that provides resources, services, and/or data. Cloud services layer 110 may provide cloud services. For example, cloud services layer 110 may provide service registration, service management, and service access to services. According to an exemplary embodiment, as previously described, cloud services layer 110 may include identity entity 115, security entity 120, service registration entity 125, and entitlement entity 130.

As previously described, identity entity 115 may include an entity that represents organizations, users, and services in the form of organization objects, user objects, and service objects; security entity 120 may include an entity that represents permissions, roles, policies, and privileges in the form of permission objects, role objects, policy objects, and privilege objects; service registration entity 125 may include an entity that represents a set of operations to allow a user to register a service; and entitlement entity 130 may include an entity that represents a set of operations to assign permissions and determine access to cloud environment 105 or to a service provided within cloud environment 105. Identity entity 115, security entity 120, service registration entity 125, and entitlement entity 130 may be implemented by one or more network devices. By way of example, the network device(s) may include server(s), gateway(s), security device(s), access point device(s), and/or some other type of network device(s).

Services 140 may include various network devices, such as, for example, servers, storage devices, data centers, etc., which provide services.

User device 150 may include, for example, a mobile device, a stationary device, a handheld device, a tablet device, or a portable device. For example, user device 150 may include a computational device (e.g., a desktop computer, a laptop computer, a palmtop computer, etc.), a communication device (e.g., a wireless phone, a wired phone, an Internet-access device, etc.), a gaming device, a location-aware device, a multimedia device (e.g., a music playing device, a video playing device, etc.), a data organizing device (e.g., a personal digital assistant (PDA), etc.), and/or some other type of user device.

FIGS. 1B-1E are diagrams illustrating an exemplary process in which an exemplary cloud environment may provide service registration and offer access to services. Referring to FIG. 1B, it may be assumed that a user (not illustrated) initiates a service registration process with cloud services layer 110 via user device 150-1. Also, it may be assumed that the user has permission to perform the service registration.

Figure 1C:
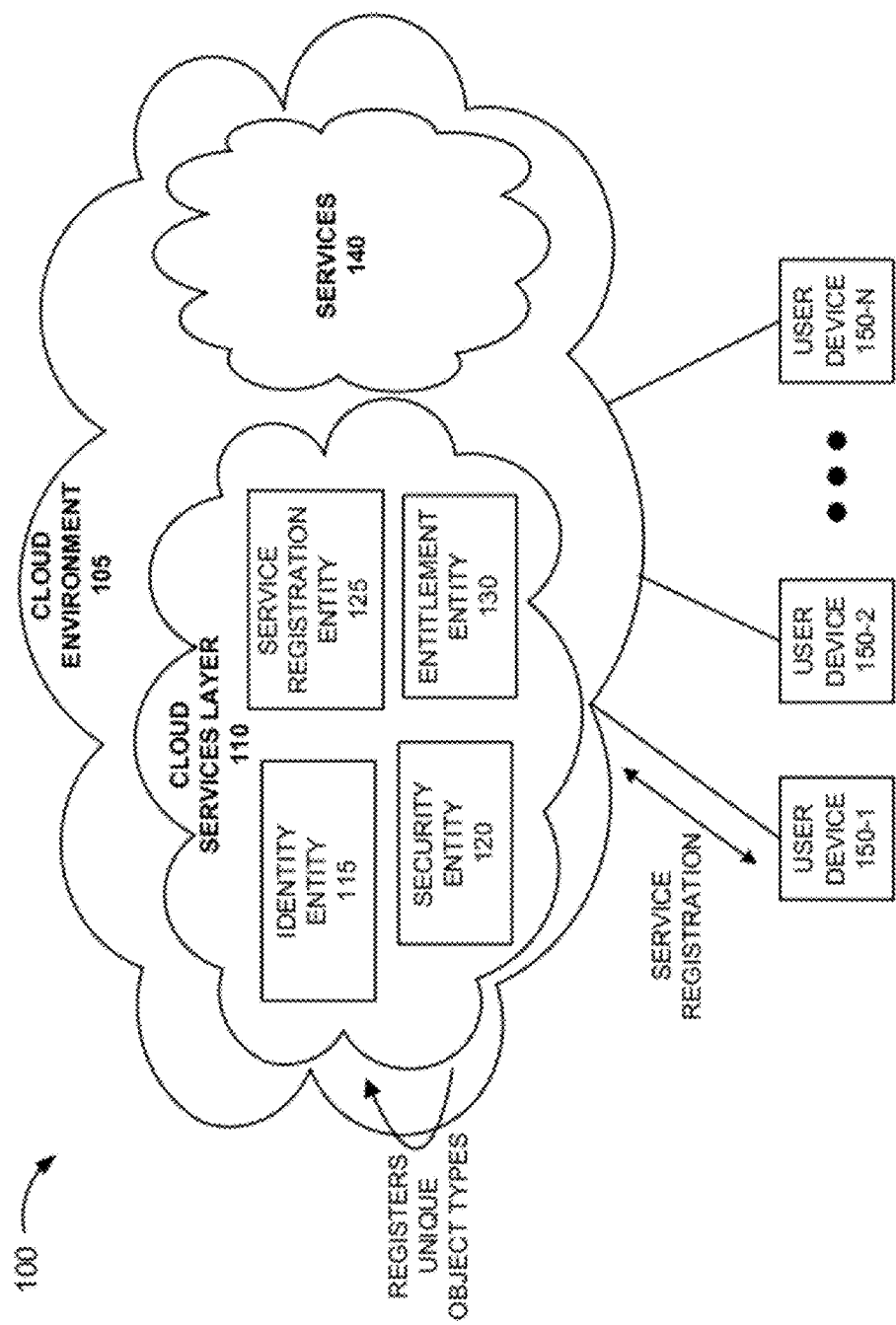

Referring to FIG. 1C, the user may be able to register, among other things, unique object types that are service-related object types. The user may also be able to register permissions, roles, privileges, etc., that pertain to the unique object types. In this way, according to the exemplary process, cloud services layer 110 may permit the user to customize and/or individualize the service being offered, and the permissions, the policies, the roles, the privileges, etc., associated with access to and use of the service. As an example, the user may register a disk object as a unique, service-related object. The user may also register permission objects to mount or dismount the disk pertaining to the disk object.

Figure 1D:
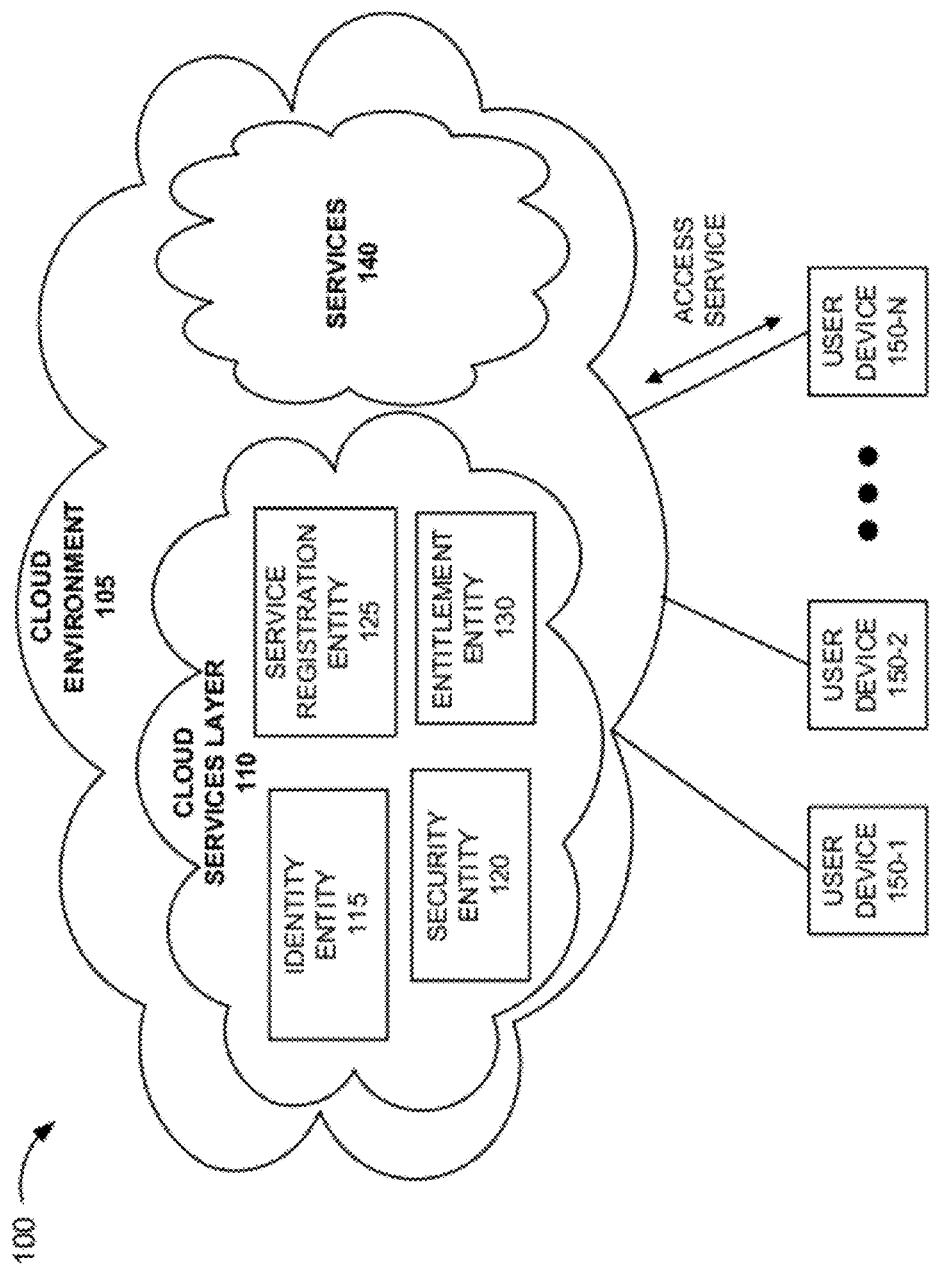
Figure 1E:
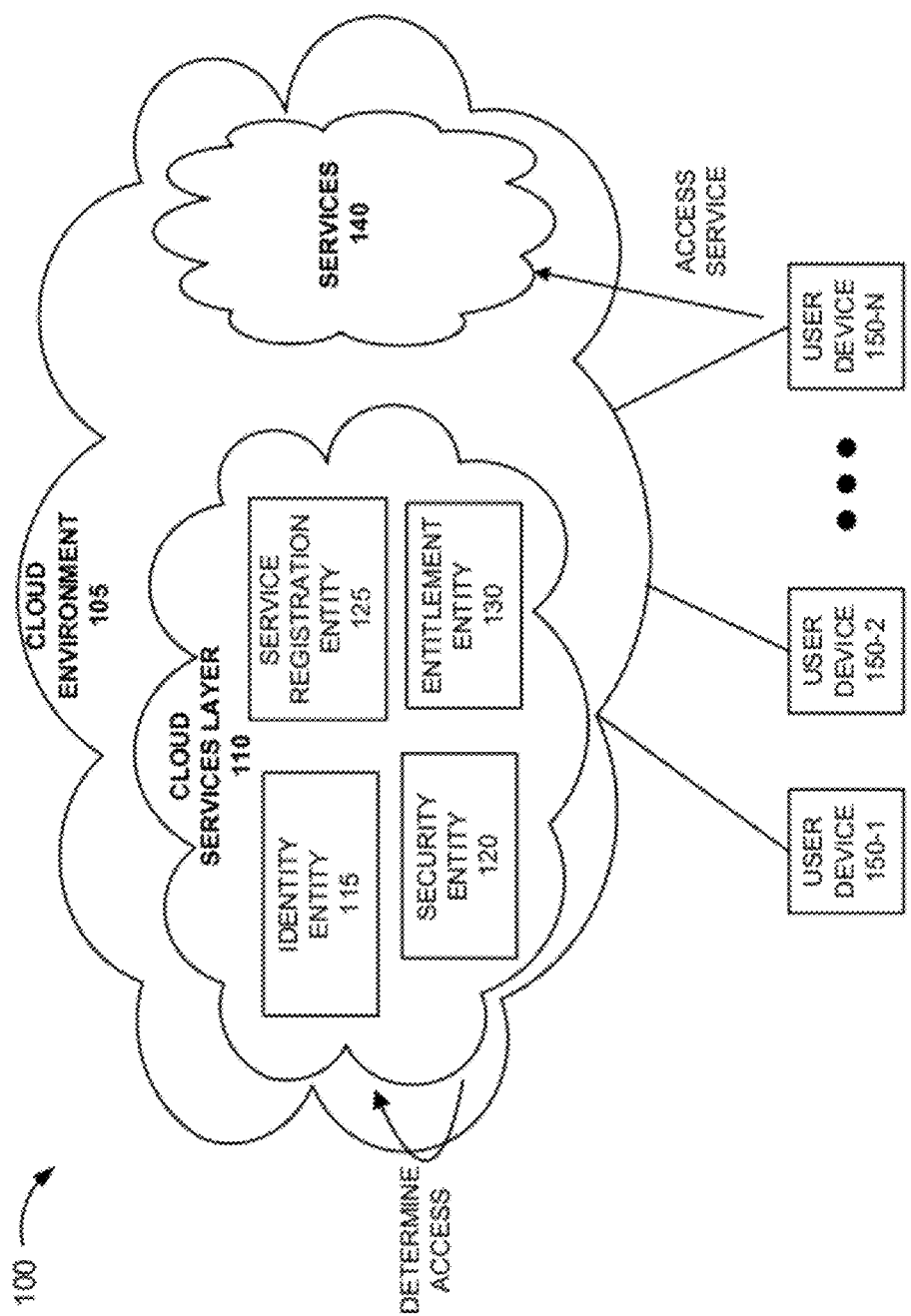

Referring to FIG. 1D, another user (not illustrated) may initiate access to cloud environment 105 for a service provided in services 140. As illustrated in FIG. 1E, cloud services layer 110 may, among other things, determine whether the other user is granted access based on privileges, etc., created during the service registration process. It may be assumed that the other user has the necessary privileges, etc. The other user is granted access to the service provided by services 140, as illustrated in FIG. 1E.

As described above, according to other embodiments, depending on the service, the other user may access the service outside of cloud environment 105. For example, the service registered may correspond to a management service.

In view of the above, according to an exemplary embodiment, cloud environment 105 may include cloud services layer 110 that supports a configurable relationship between an organization, users, a group, and a service in which the service may include unique, service object types. By way of example, a server may have a reboot feature that requires specific control permission to execute. According to another example, a mail system may have a change-mailbox-size feature that has its own specific control permission. In this way, a user's access to particular features associated with a service may be controlled based on a customized configuration of the service. A further description of exemplary embodiments is provided below.

Cloud services layer 110 may allow a user registering a service to control access to the service in various degrees. By way of example, an organization may not wish for its resources to be accessible by any other organization. Alternatively, for example, an organization may wish that a portion of its resources is accessible to other (known or unknown) organization(s). Additionally, for example, users may have varying degrees of accessibility depending on the service they are attempting to access. Additionally, different services may have different features that may be accessible or not to each user.

Figure 2:
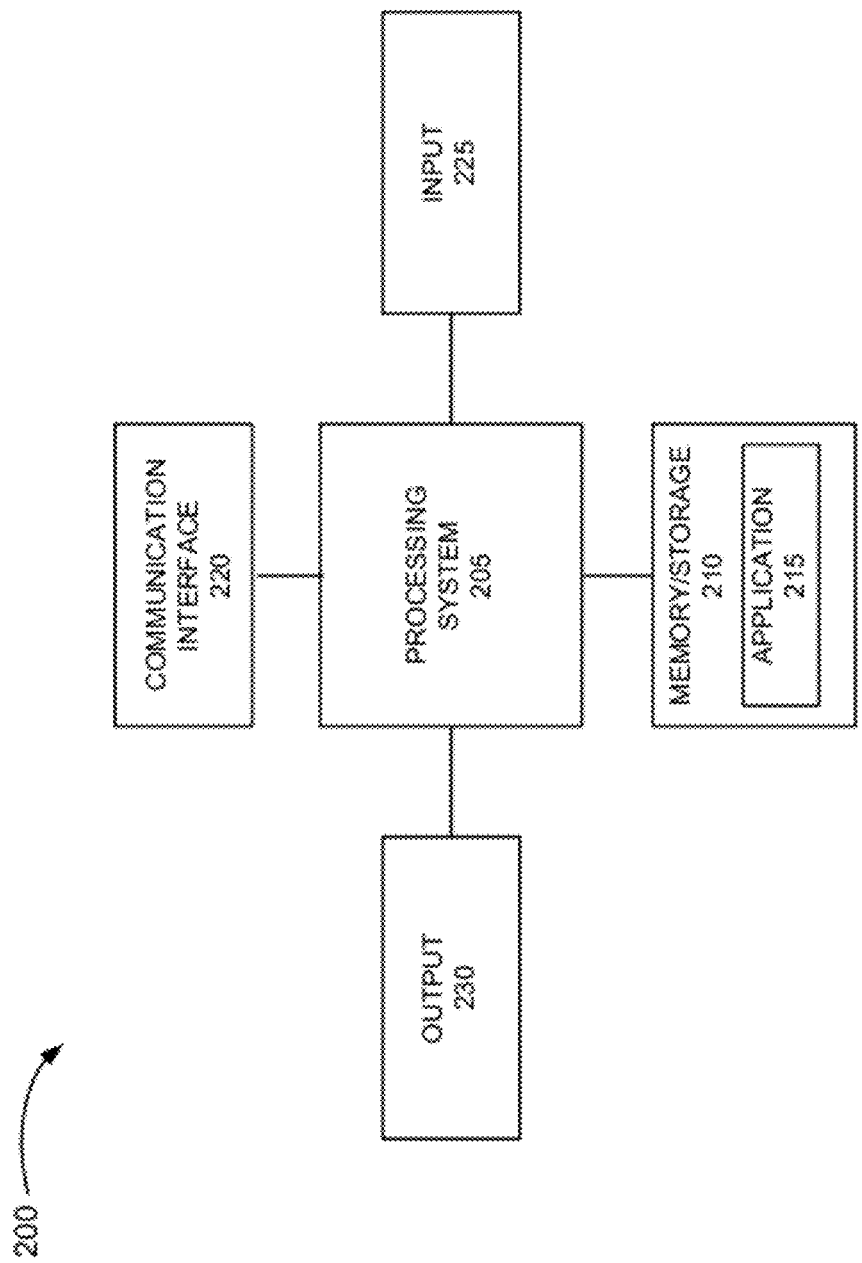
FIG. 2 is a diagram illustrating exemplary components of a device that may correspond to one or more of the devices in the environments depicted in FIGS. 1A-1E.

FIG. 2 is a diagram illustrating exemplary components of a device 200 that may correspond to one or more of the devices in environment 100. For example, device 200 may correspond to one or more devices of cloud services layer 110 (e.g., identity entity 115, security entity 120, service registration entity 120, and/or entitlement entity 130), of services 140, and/or of user device 150.

As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of storage devices. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a secondary storage medium, a CD, a DVD, or another type of tangible storing medium. Memory/storage 210 may store data, application(s), and/or instructions related to the operation of device 200.

Application 215 may include software that provides various services and/or functions. For example, with reference to and according to an exemplary embodiment, application 215 may include one or multiple applications that perform one or more operations performed by cloud services layer 110.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, etc.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage 210 or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

Figure 3A:
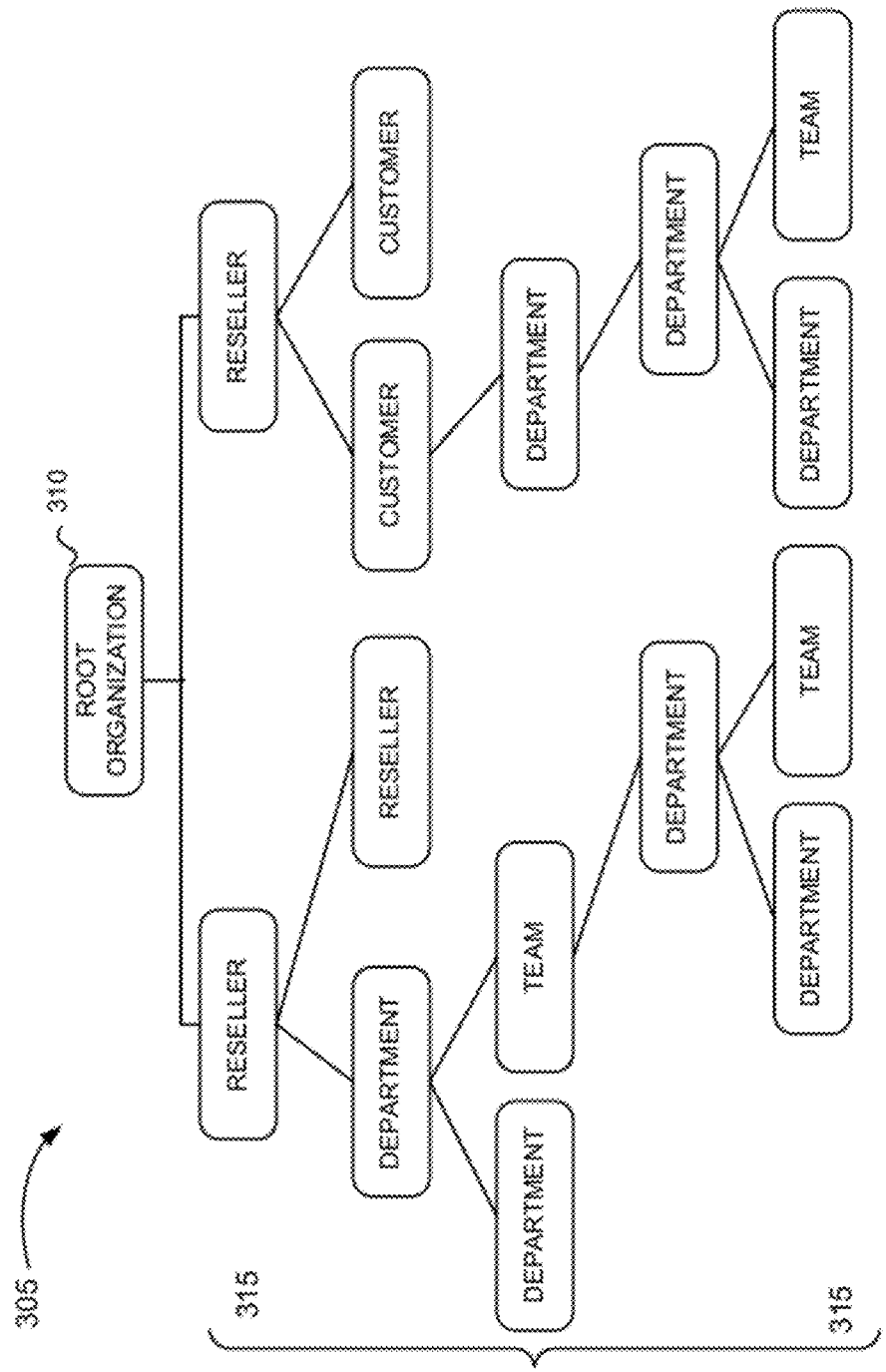
FIG. 3A is a diagram illustrating an exemplary organization object.

As previously described, according to an exemplary embodiment, identity entity 115 may include an organization object, a user object, a group object, and a service object. The organization object may represent a collection point for users, groups, services, and/or other entities. FIG. 3A is a diagram illustrating an exemplary organization object 305. For example, as illustrated, organization object 305 may have a hierarchical structure that includes a root organization object 310 from which a tree structure stems. Root organization object 310 may have no parent while all other organization objects (e.g., leaf objects 315) may have a single parent. In this example, leaf objects 315 of the tree may represent resellers, customers, departments, teams, or other entities that may map to an organizational strategy and/or an organizational architecture. According to other embodiments, other types of labels, etc., associated with leaf objects 315 may be used to categorize the structure of organization object 305. Additionally, or alternatively, according to other embodiments, organization object 305 may have a structure different from that specifically described and illustrated in FIG. 3A.

Figure 3B:
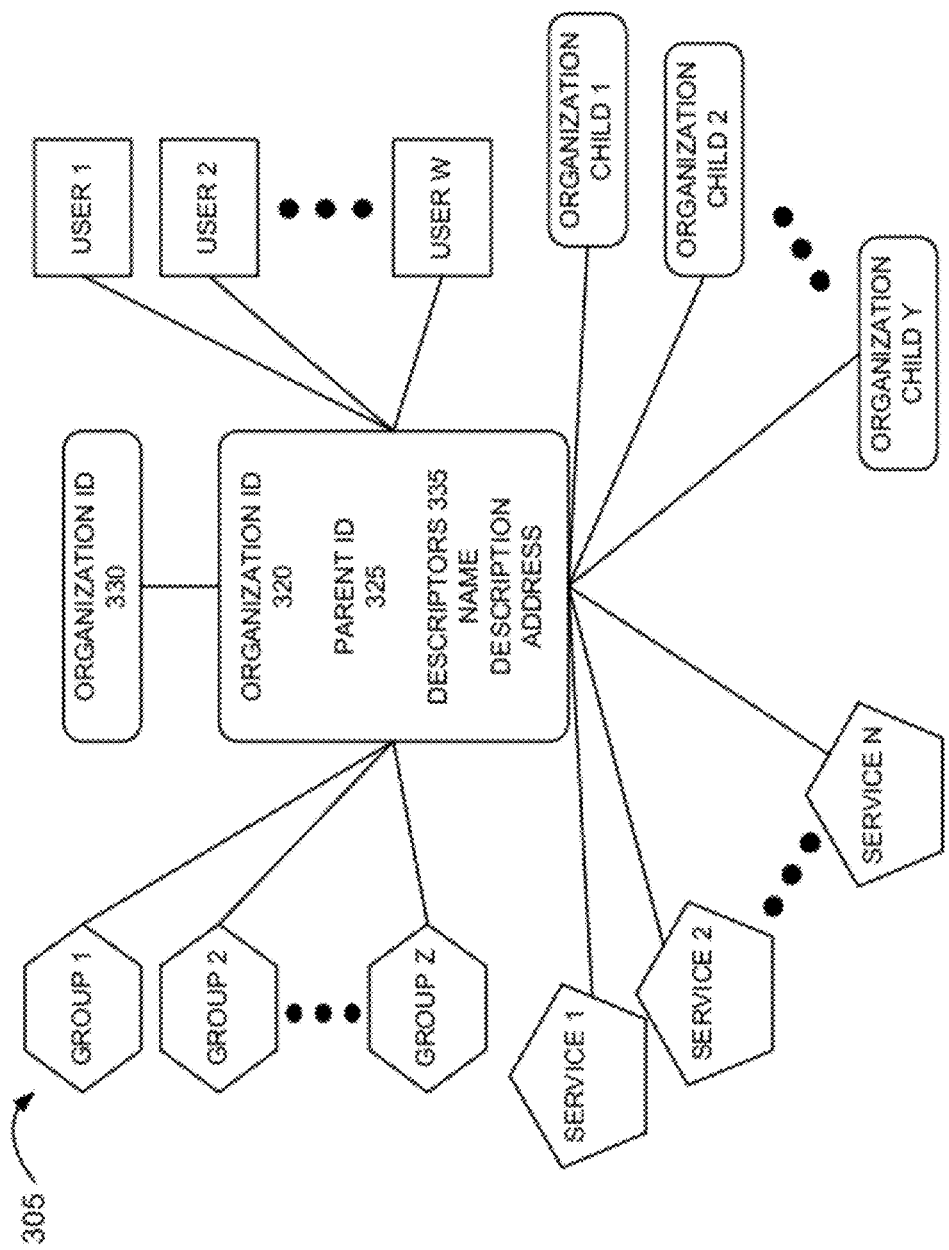
FIG. 3B is a diagram illustrating exemplary properties associated with an organization object.

Referring to FIG. 3B, according to an exemplary embodiment, organization object 305 may include various properties such as, for example, an organization identifier 320 and a parent identifier 325. Organization identifier 320 may be a unique identifier (e.g., a string, numbers, letters, etc.) that identifies an organization. Parent identifier 325 may be an identifier that identifies a parent of the organization. For example, parent identifier 325 may correspond to an identifier associated with organization identifier 330. That is, in this example, as illustrated in FIG. 3B, the organization associated with organization identifier 330 may be the parent of the organization associated with organization identifier 320.

According to an exemplary embodiment, organization object 305 may include one or more descriptors 335, such as, for example, name (e.g., name of the organization), address (e.g., physical address of the organization), and description (e.g., a description of the organization, what it does, etc.,). As further illustrated in FIG. 3B, organization object 305 may be linked to other objects that may belong to the organization object 305. For example, user 1, user 2, . . . , user W, group 1, group 2, . . . , group Z, service 1, service 2, . . . , service N, and organization child 1, organization child 2, . . . , organization child Y, may represent objects that belong to organization object 305.

A user object may represent an individual operator, such as, for example, a person or a function. According to an exemplary embodiment, the user object may include various properties including, for example, a user identifier and an organization identifier. The user identifier may be a unique identifier that identifies the user object. The organization identifier may be an identifier of the organization object to which the user object belongs. According to an exemplary embodiment, the user object may include one or more descriptive properties, such as, for example, name (e.g., name of the user), address (e.g., physical address of the user), and description (e.g., position in organization, etc.).

According to an exemplary embodiment, the user object may belong to only one organization object. According to such an embodiment, the user object may be granted privileges regardless of where the user object resides in, for example, an organization. That is, in contrast to other approaches, privileges may not be limited to a user based on the organization of which the user is a member. According to other exemplary embodiments, the user object may belong to multiple organizations.

The user object may be a member of one to multiple group objects. The user object may be associated with one to multiple privileges, directly, or indirectly through group and/or organizational membership. For example, a privilege may be directly associated with the user object or indirectly when the user object belongs to a group (e.g., of user objects, etc.).

A group object may represent a collection of user objects, group objects, and/or organization objects. According to an exemplary embodiment, the group object may include various properties including, for example, a group identifier and an organization identifier. The group identifier may be a unique identifier that identifies the group object. The organization identifier may be an identifier of an organization object to which the group object belongs. According to an exemplary embodiment, the group object may include one or more descriptive properties, such as, for example, name (e.g., name of the group) and description (e.g., what the group does, etc.).

According to an exemplary embodiment, the group object may belong to only one organization. According to other exemplary embodiment, the group object may belong to multiple organizations. A group object may be a member of one to multiple group objects. A group object may be associated with one to multiple privileges, directly, or indirectly through group membership.

According to an exemplary embodiment, a group object may have links (e.g., relationships with, pointers to, etc.) to other objects which are members of the group object, such as, for example, user objects, group objects, and/or organization objects. For example, the user objects may be objects that belong to the group object, the group objects may be a collection of group objects that belong to the group object, and the organization objects may be organization objects that belong to the group object.

A service object may represent a service or a feature, a function, etc., associated with the service. According to an exemplary embodiment, the service object may include various properties including, for example, a service identifier, a name identifier, and an organization identifier. The service identifier may be a unique identifier that identifies the service object. The name identifier may be an identifier that labels the service object. The organization identifier may be an identifier of the organization object to which the service object belongs. According to an exemplary embodiment, the service object may include one or more descriptive properties, such as, for example, a description (e.g., a description of the service).

According to an exemplary embodiment, a service object may belong to only one organization. According to other exemplary embodiments, the service object may belong to multiple organizations. The service object may be associated with one to multiple privileges, directly, or indirectly through a group and/or an organizational membership.

According to an exemplary embodiment, a service object may have links to security objects, such as, for example, permission objects, role objects, and/or policy objects. For example, permission objects may represent permissions that belong to the service objects, the role objects may represent roles that belong to the service objects, and the policy objects may represent policies that belong to the service objects.

According to an exemplary embodiment, during a service registration process, a user may create service-related objects that are unique versus restricted to pre-defined object types. In this way, the user is able to customize a service, its features, etc., offered to users, etc.

As previously described, according to an exemplary embodiment, security entity 120 may include a permission object, a role object, a policy object, and a privilege object. According to an exemplary embodiment, the privilege object may associate a policy object with a user object, a policy object with a group object, and/or a policy object with an organization object. According to an exemplary embodiment, the privilege object may include various properties including, for example, a privilege identifier, a policy identifier, and a member identifier. Additionally, the privilege object may allow and deny attributes (e.g., whether a policy is granted or denied).

The privilege identifier may be a unique identifier that identifies the privilege object. The policy identifier may be an identifier of a policy object being associated with the privilege object/the user object. The member identifier may be a unique identifier that identifies a user object, a group object, or an organization object associated with the policy object, the privilege object, etc. The attributes associated with denial and allowance may correspond to logic that determines whether the policy is being granted or denied. By way of example, the logic may be expressed as a Boolean expression. The privilege object may be linked to an object (e.g., a user object, a service object, etc.) to which it applies.

FIG. 3C is a diagram illustrating an exemplary user interface that may be associated with a privilege object. In this example, the user interface may allow a user to manage associations related to an instance of a privilege object linked to an object called "Org. A—My-Farm." As illustrated, these associations include policy fields 340, member fields 345, and allow/denial fields 347. For example, as illustrated in FIG. 3C, policy fields 340 may indicate a Caas-admin policy that may be associated with various groups (e.g., Ram admim-group, Pvv-admin group, and IT-admin group) of member fields 345. Allow/denial fields 347 may indicate allowance or denial of these policies to the specified members. As further illustrated, the user interface may also allow a user to create new associations between policies and members, remove associations, etc. In this way, the user may manage policies, user/group/organization, and permissions with respect to the privilege object.

In practice, the privileges user interfaces may be the only user interfaces associated with security entity 120 that may be accessed, used, etc., by an end user. Typically, user interfaces associated with policies, roles, and permissions may not be accessed, used, etc., by an end user (i.e., a user accessing the registered service), and may be populated when a service is registered with cloud environment 105.

Described below are other exemplary user interfaces. In practice, one or more of the user interfaces may not be available to the end user. Rather, these user interfaces may be available to users registering/managing the services.

Figure 3D:
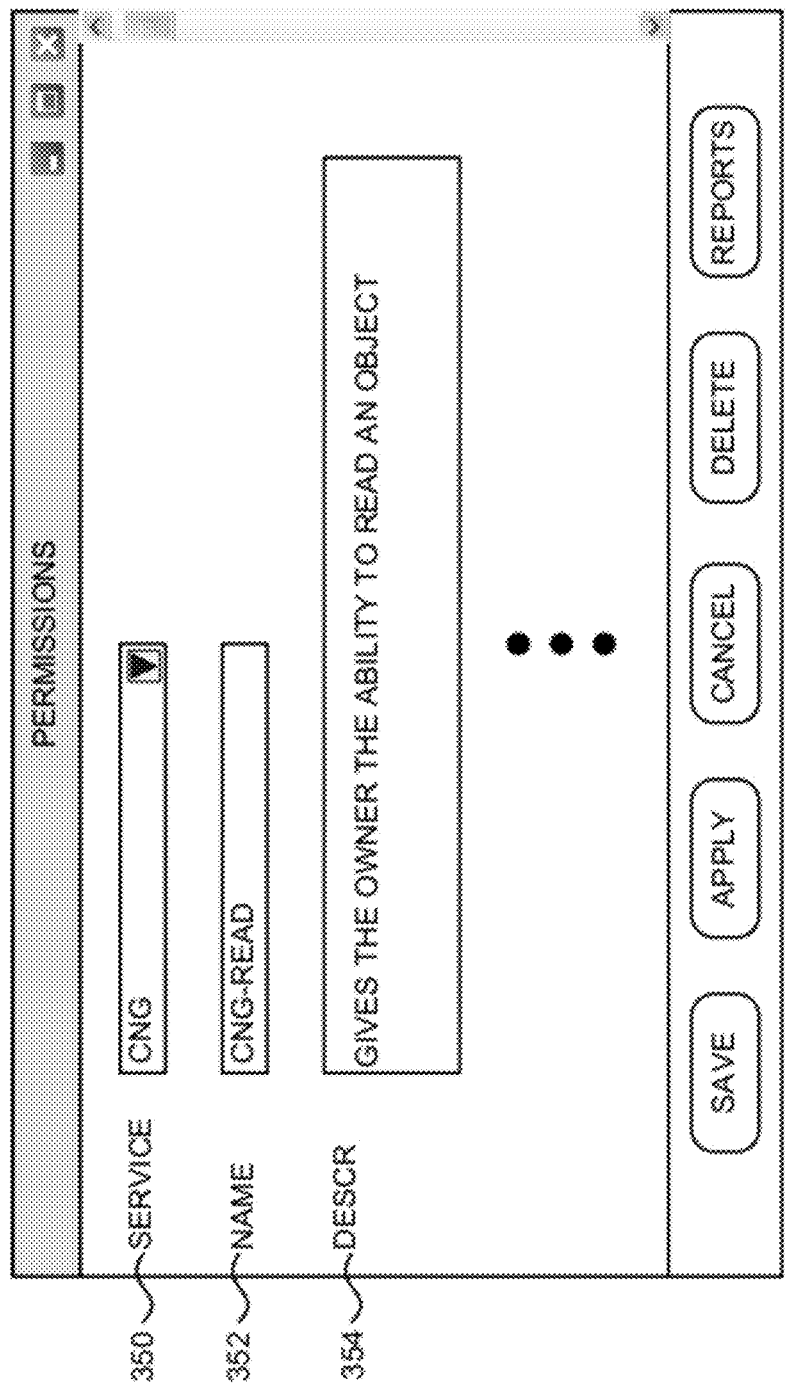
FIG. 3D is a diagram illustrating an exemplary user interface associated with a permission object.

FIG. 3D is a diagram illustrating an exemplary user interface associated with a permission object. A granting or a denial of a permission may determine whether there is user access to a function or an object. In this example, the user interface may include, among other fields, a service field 350, a name field 352, and a description field 354. Service field 350 may be used to enter a service identifier (e.g., CNG), which may be a unique identifier. The service identifier may be an identifier of the service that owns the permission. Name field 352 may be used to enter a name of the permission object (e.g., CNG-read), which may be unique (e.g., within a service). Description field 354 may be used to enter a free-style description of the permission object. Permission objects may also be managed (e.g., added, modified, deleted, etc.) during service registration.

Figure 3E:
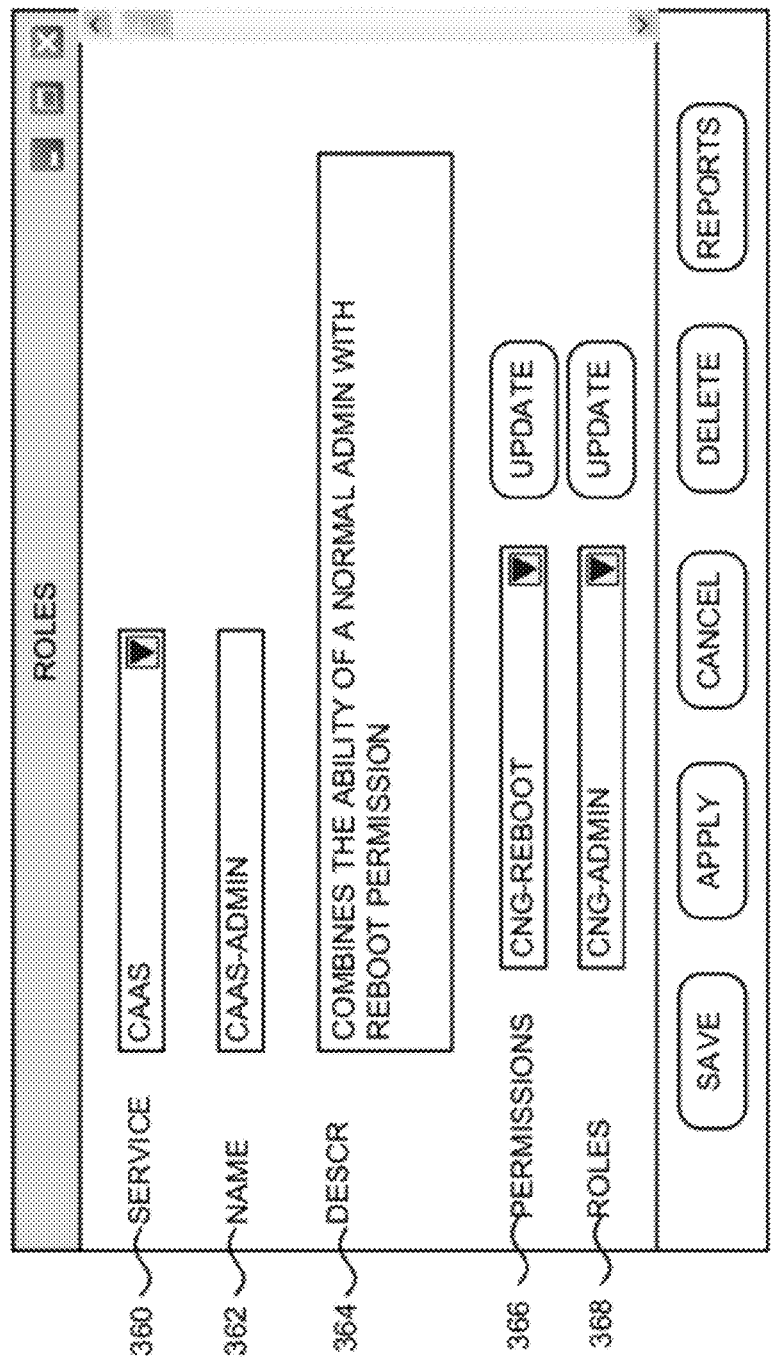
FIG. 3E is a diagram illustrating an exemplary user interface associated with a role object.

FIG. 3E is a diagram illustrating an exemplary user interface associated with a role object. As previously described, a role object may specify one or multiple permissions and/or roles. A role object may be used to bundle permissions so that permissions may be granted as a collection of permissions rather than individually. In this example, the configurable collection of permissions and roles may represent a common job function (e.g., administration).

As illustrated, in this example, the user interface may include a service field 360, a name field 362, a description field 364, a permissions field 366, and a roles field 368. Service field 360 may be used to enter a service identifier (e.g., Cass), which may be a unique identifier. The service identifier may be an identifier of the service that owns the role. Name field 362 may be used to enter a name (e.g., Caas-admin), which may be unique. Description field 364 may be used to enter a free-style description of the role object. Permissions field 366 may be used to enter a collection of permissions associated with this role (e.g., Cng-reboot). Roles field 368 may be used to enter a collection of roles associated with this role object (e.g., Cng-admin). Role objects may also be managed during service registration.

FIG. 3F is a diagram illustrating an exemplary user interface associated with a policy object. As previously described, a policy object may associate one or multiple roles with one or multiple objects. For example, the policy object may specify a collection of roles and/or a collection of policies to an object-type with specific attributes.

As illustrated, in this example, the user interface may include a service field 370, a name field 372, a description filed 374, a roles field 376, a policies field 378, an object-type field 380, and an object attributes field 382. Service field 370 may be used to enter a service identifier (e.g., Caas), which may be a unique identifier. The service identifier may be an identifier of the service that owns the policy object. Name field 372 may be used to enter a name (e.g., Caas-admin policy), which may be unique. Description field 374 may be used to enter a free-style description of the policies object. Roles field 376 may be used to enter a collection of roles (e.g., Caas-admin) associated with this policy object. Policies field 378 may be used to enter a collection of policies associated with this policy. Object-type field 380 may be used to enter a list of object types (e.g., Caas-farm) to which this policy applies. Object attributes field 382 may be used to enter a collection of object attributes (e.g., Garm-compliant) that may be needed for this policy object to apply. Policy objects may be also managed during service registration.

According to an exemplary embodiment, a user may go through a process of registration when a service is added to cloud environment 105. That is, the registration process may allow the service to be offered to users having the appropriate permissions.

Figure 4A:
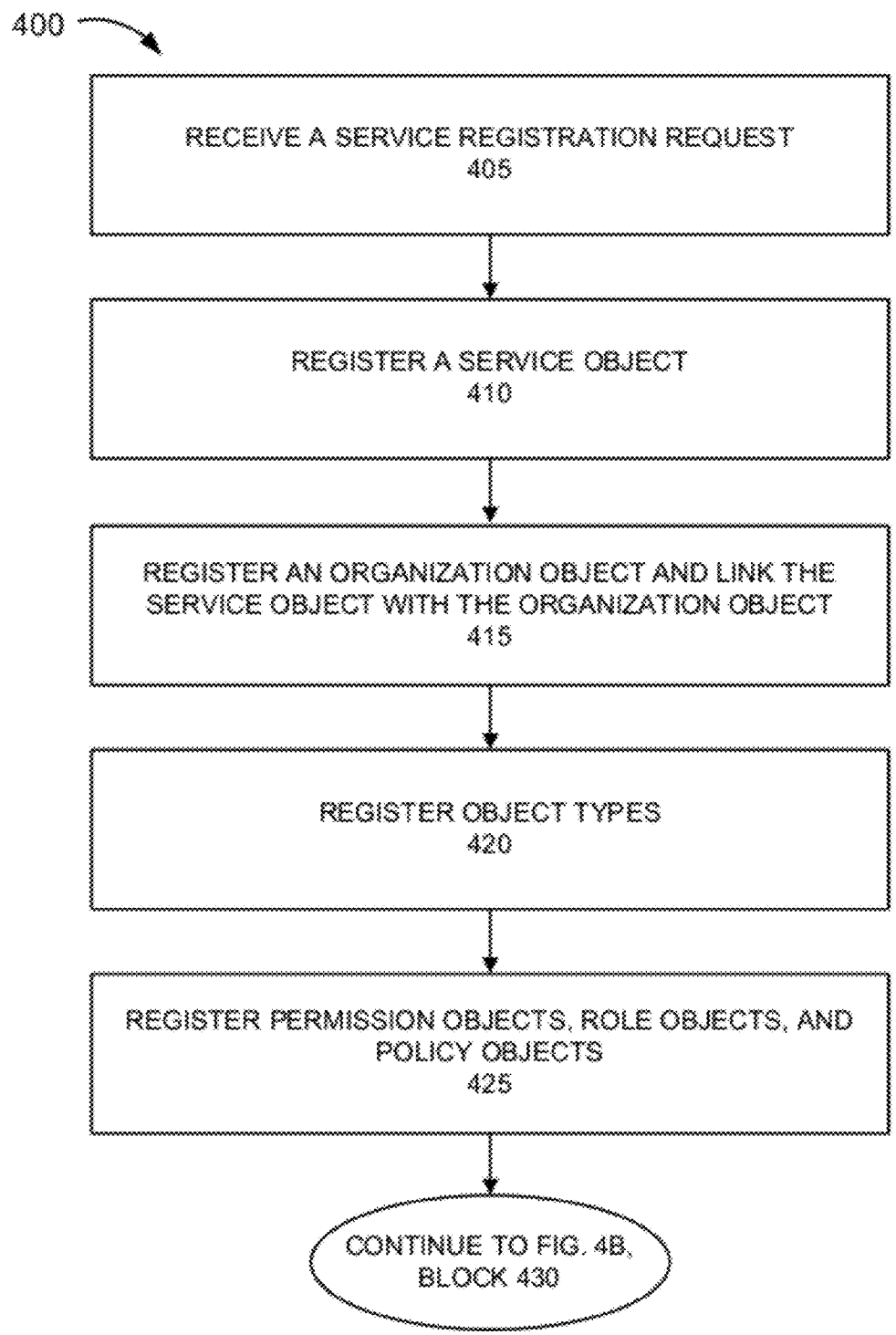
FIGS. 4A-4B are a flow diagram illustrating an exemplary process in which service registration may be provided by the exemplary cloud environment that includes the cloud services layer.
Figure 4B:
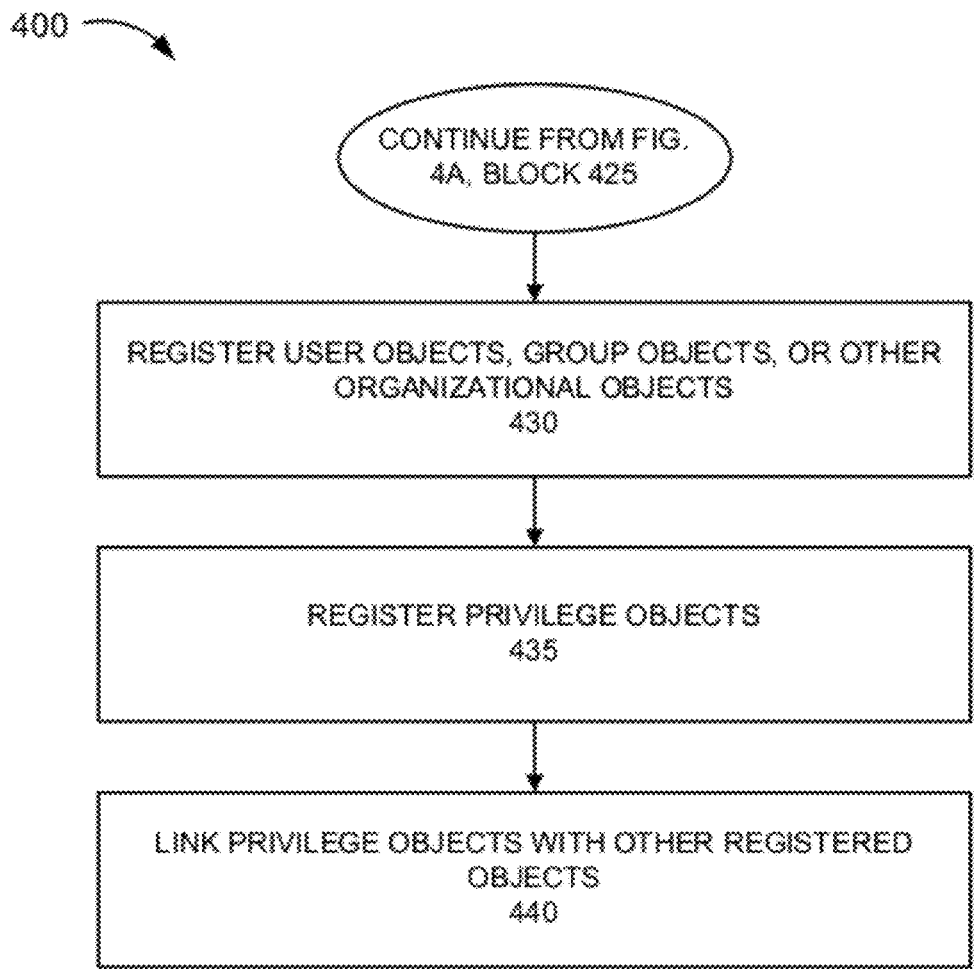

FIGS. 4A-4B is a flow diagram illustrating an exemplary process 400 in which service registration may be provided by an exemplary embodiment of cloud environment 105 that includes cloud services layer 110. According to an exemplary embodiment, cloud services layer 110 may provide user interfaces to allow a user to register a service and interact with cloud services layer 110.

Process 400 may include receiving a service registration request (block 405). For example, a user may access cloud services layer 110 via user device 150 to request service registration of a service. Cloud services layer 110 may determine whether the user has permission to register the service.

A service object may be registered (block 410). For example, the user may register a service object with cloud services layer 110 based on a service object type provided by cloud services layer 110. As previously described, the service object may include various properties including, for example, a unique service identifier.

An organization object may be registered (block 415). For example, the user may register an organization object with cloud services layer 110 based on an organization object type provided by cloud services layer 110. As previously described, the organization object may include various properties, including, for example, an organization identifier and a parent identifier. The organization object may be linked to the service object.

Object types may be registered (block 420). For example, the user may register object types with cloud services layer 110. According to an exemplary embodiment, the object types may include unique, service-related object(s) that is/are not provided by cloud services layer 110, as previously described. The user may also register object types that may be provided by cloud services layer 110, such as, for example, permission object, role object, privilege object, user object, service object, etc., as previously described.

Permission objects, role objects, and policy objects may be registered (block 425). For example, the user may register objects (e.g., instantiated objects) pertaining to the object types registered with cloud services layer 110. The objects registered may include permission objects, role objects, and policy objects.

User objects, group objects, or other organizational objects may be registered (block 430). For example, the user may register objects (e.g., instantiated objects) pertaining to the object types registered with cloud services layer 110. The objects registered may include user objects, group objects, or other types of organizational objects.

Privilege objects may be registered (block 435). For example, the user may register objects (e.g., instantiated objects) pertaining to the object types registered with cloud services layer 110. The objects registered may include privilege objects.

Privilege objects may be linked with other registered objects (block 440). For example, the user may link the privilege objects with other objects registered with cloud services layer 110.

Although FIGS. 4A-4B illustrate an exemplary process 400 for providing service registration, according to other embodiments, process 400 may include additional operations, fewer operations, and/or different operations than those illustrated in FIGS. 4A-4B.

As previously described, when a service is registered with cloud services layer 110, users may access and use the service based on the objects registered. According to an exemplary embodiment, an entitlement process may be performed. For example, the entitlement process may include determining whether permission is granted or denied before an action and/or an operation associated with the user is performed. According to an exemplary embodiment, an entitlement request (e.g., a function call, etc.) may be generated when permission is needed. For example, a function call may be expressed as a Boolean statement, such as, for example:

Boot=HasPermission(object, operator, permission, default);

where "object" may correspond to the object being operated on, "operator" may correspond to the user requesting access, "permission" may correspond to the permission being requested, and "default" may correspond to a value (e.g., a default privilege) to return if no specific indication is found. "Bool" may correspond to a true or a false that corresponds to an allowance or a denial. According to other embodiments, additional, different, and/or fewer arguments may be used to resolve an entitlement request.

According to an exemplary embodiment, the entitlement request may search the privileges associated with the object to determine if the user has the necessary permission. If the permission is not found with, for example, an allow specification or a deny specification, then the default value may be returned. The entitlement process may then determine whether to allow or deny the permission based on the default value.

Cloud environment 105 may apply various rules concerning permission checks. In some instances, a user's permission may involve multiple privileges. For example, the user may be allowed permission through one privilege, but denied the permission through another privilege. According to an exemplary embodiment, the following rules may be used to resolve the granting or the denial of the user to access a service, a feature of a service, etc., or some other action, operation, etc. According to an exemplary rule, the closer the user is specified to a privilege, the higher the priority of that privilege. For example, a privilege that may be directed to the user may have a higher priority than a privilege that may be directed to a group of which the user is a member. Similarly, a privilege that may be directed to a group of which the user is a member may have a higher priority than a privilege that may be directed to a group of which multiple groups are a member and the user is a member of one of the groups.

Given the above, once a user and/or a privilege may be identified, the privilege having a higher priority may be used. For example, once a user and/or a privilege may be found, further drill-down may not be necessary to determine whether to grant or deny the privilege. In the event that the user is not found, a default value may be used. Additionally, if the user is found more than once at the same level/priority (i.e., a conflict exists), the default value may be used.

According to an exemplary embodiment, cloud environment 105 may use privilege inheritance in relation to policies. For example, if a policy exists with respect to an object, the object may be examined. If the user is not found, the policy search may move "up the tree" (e.g., the organization tree). Depending on the object being checked and/or the service requested, the process of searching "up the tree" may be different. In some instances, an object may not have a policy search performed. Described below are examples of potential policy searches.

For example, if the policy pertains to cloud environment 105, if there is no policy for a user (e.g., a user object), then the user's organization may be examined for the policy. If there is no policy for the user's organization, then a parent organization may be examined. This process may continue until a root organization associated with the user is examined.

According to another example, if the policy pertains to a server (e.g., a server object), if there is no policy for the server, then the server's farm may be examined. If there is no policy for the server's farm, then the farm's organization may be examined. If there is no policy for the farm's organization, then a root organization associated with the server may be examined. In this example, it may be assumed that the server object is associated with a service that registered a farm object, etc., with cloud environment 105.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 4A and 4B, the order of the blocks may be modified in other implementations. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the present application should be construed as critical or essential to the implementations described herein unless explicitly described as such.

What is claimed is:

1. A method comprising:
    receiving a service registration request to register a new service with a multi-tenant, multi-service cloud network;
    registering object types applicable to the new service, wherein the object types include at least one object type, which is not included in a predefined set of object types offered by the multi-tenant, multi-service cloud network to users to register a service, wherein the at least one object type relates to at least one of an entity of the new service, a function of the new service, access to the new service, or use of the new service;
    registering objects based on the object types, wherein the objects include at least one object associated with the at least one object type, and wherein the objects are instances of the object types; and
    registering the new service with the multi-tenant, multi-service cloud network based on the registered object types and the registered objects.

2. The method of claim 1, wherein the object types include a service object type that is offered by the cloud network to the user.

3. The method of claim 1, wherein the object types include a policy object type, a role object type, a permission object type, and a privilege object type, and the method further comprising:
    registering policy objects, role objects, permission objects, and privilege objects that pertain to the object types.

4. The method of claim 3, wherein the object types include a user object type, a group object type, and an organization object type, and the method further comprising:
    registering user objects, group objects, and organization objects that pertain to the object types; and
    linking the privilege objects with other registered objects.

5. The method of claim 1, wherein the object types include an organization object type, and the method further comprising:
    registering a root organization object, wherein the root organization object includes a root organization identifier; and
    registering at least one child organization object, wherein the at least one child organization object includes an at least one organization identifier that identifies the at least one child organization object and an at least one parent identifier that identifies a parent organization object of the at least one child organization object.

6. The method of claim 1, wherein the object types include a user object type, and the method further comprising:
    registering user objects that each include an object identifier that identifies a user object and an organization identifier that identifies an organization object that the user object belongs;
    registering privilege objects; and
    allowing the user objects to inherit the privilege objects directly or indirectly through an organization membership associated with the user objects.

7. The method of claim 1, further comprising:
    performing a permission check when a user requests to perform an action with respect to a registered service, wherein the permission check includes:
        determining whether a privilege exists for the user requesting to perform the action; and
        assigning a default privilege to the user requesting to perform the action when a privilege does not exist for the user requesting to perform the action.

8. The method of claim 7, further comprising:
    assigning a higher priority to a privilege relative to another privilege when the privilege is determined to be more directly linked to the user requesting to perform the action than the other privilege;
    selecting the privilege having the higher priority relative to the other privilege having a lower priority; and
    determining whether to grant or deny the action based on the selected privilege.

9. The method of claim 1, wherein the new service includes one of an end service, a management service, or a function associated with the new service.

10. The method of claim 1, further comprising:
    registering a service object that includes a service identifier that identifies the new service and an organization identifier that identifies an organization to which the service object belongs.

11. A cloud services layer comprising one or more devices, wherein the one or more devices comprise:
    one or more transceivers;
    one or more memories to store instructions; and
    one or more processors to execute the instructions to:
        receive, via at least one of the one or more transceivers, a service registration request to register a new service with a cloud network;
        register object types applicable to the new service, wherein the object types include at least one object type, which is not included in a predefined set of object types offered by the cloud network to users to register a service, wherein the at least one object type relates to at least one of an entity of the new service, a function of the new service, access to the new service, or use of the new service;
        register objects based on the object types, wherein the objects include at least one object associated with the at least one object type, and wherein the objects are instances of the object types;

register the new service with the cloud network based on the registered object types and the registered objects; and grant or deny use of the new service or a function associated with the new service based on the objects.

12. The cloud services layer of claim 11, wherein the object types include a policy object type, a role object type, a permission object type, and a privilege object type, and the objects include a policy object, a role object, an permission object, and a privilege object.

13. The cloud services layer of claim 11, wherein the object types include a service object type that is offered by the cloud network to the user.

14. The cloud services layer of claim 11, wherein the object types include a user object type, a group object type, and an organization object type, and the objects include a user object, a group object, and an organization object.

15. The cloud services layer of claim 14, wherein the one or more processors to execute the instructions to:

allow the user object to inherit a privilege object directly or indirectly through a group membership or an organization membership associated with the user object.

16. The cloud services layer of claim 11, wherein the one or more processors to execute the instructions to:

perform a permission check when a user requests to access or use a registered service, wherein the permission check includes:

determine whether a privilege exists for the user requesting to perform the action;

assign a default privilege to the user requesting to perform the action when a privilege does not exist; and grant or deny the access to or the use of the registered service based on the default privilege.

17. The cloud services layer of claim 16, wherein the one or more processors to execute the instructions to:

assign a higher priority to a privilege relative to another privilege when the privilege is determined to be more directly linked to the user requesting to access or use the registered service;

select the privilege having the higher priority relative to the other privilege having a lower priority; and determine whether to grant or deny the access or the use of the registered service based on the selected privilege.

18. The cloud services layer of claim 11, wherein the objects include a privilege object that associates at least one of a policy object with a user object, a policy object with a group object, or a policy object with an organization object, and the one or more processors to execute the instructions to:

deny or grant permission to a user to access or use a registered service based on the privilege object.

19. The cloud services layer of claim 11, wherein the one or more processors to execute the instructions to:

register links between an organization object and at least one of a user object, a group object, or a service object; and register links between a service object and at least one of a permission object, a role object, or a policy object.

20. A non-transitory storage medium storing instructions executable by at least one processor, the non-transitory storage medium storing instructions for:

receiving a service registration request to register a new service with a multi-tenant, multi-service cloud network;

registering object types applicable to the new service, wherein the object types include at least one service object type, which is not included in a predefined set of object types offered by the multi-tenant, multi-service cloud network to users to register a service, wherein the at least one object type relates to at least one of an entity of the new service, a function of the new service, access to the new service, or use of the new service;

registering objects based on the object types, wherein the objects include at least one object associated with the at least one service object type, and wherein the objects are instances of the object types;

registering the new service with the multi-tenant, multi-service cloud network based on the registered object types and the registered objects; and granting or denying use of the new service or a function associated with the new service based on the objects.

* * * * *